US012752240B2

(12) United States Patent
Qu et al.

(10) Patent No.: US 12,752,240 B2
(45) Date of Patent: Oct. 6, 2026

(54) HYBRID SYSTEM AND METHOD OF WASTE HEAT UTILIZATION-BASED PHOTOVOLTAIC POWER GENERATION AND SEAWATER DESALINATION

(71) Applicant: XI'AN JIAOTONG UNIVERSITY, Xi'an (CN)

(72) Inventors: Zhiguo Qu, Xi'an (CN); Qiang Wang, Xi'an (CN); Jianfei Zhang, Xi'an (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 782 days.

(21) Appl. No.: 18/144,033

(22) Filed: May 5, 2023

(65) Prior Publication Data

US 2024/0066471 A1 Feb. 29, 2024

(30) Foreign Application Priority Data

Aug. 25, 2022 (CN) ......................... 202211028990.0

(51) Int. Cl.

| | |
|---|---|
| ***B01D 61/52*** | (2006.01) |
| ***B01D 61/46*** | (2006.01) |
| ***B01D 69/02*** | (2006.01) |
| ***C02F 1/00*** | (2023.01) |
| ***C02F 1/469*** | (2023.01) |

(Continued)

(52) U.S. Cl.

CPC ........... *B01D 61/52* (2013.01); *B01D 61/463* (2022.08); *B01D 69/02* (2013.01); *C02F 1/008* (2013.01); *C02F 1/4693* (2013.01); *H02S 40/44* (2014.12); *B01D 2313/221* (2022.08); *B01D 2313/243* (2013.01); *B01D 2313/246* (2013.01); *B01D 2313/365* (2013.01); *B01D 2313/367* (2022.08); *B01D 2313/501* (2022.08); *B01D 2313/701* (2022.08); *B01D 2317/025* (2013.01); *B01D 2317/04* (2013.01); *B01D 2325/022* (2013.01); *B01D 2325/42* (2013.01);

(Continued)

(58) Field of Classification Search

CPC ......... C02F 1/4693; H02S 40/44; Y02E 10/60

See application file for complete search history.

(56) References Cited

U.S. PATENT DOCUMENTS 11,973,464 B2 * 4/2024 Qu .......................... H10F 19/40

OTHER PUBLICATIONS

CN 101993166 A—translation (Year: 2011).*
CN 108218180 A—translation (Year: 2018).*

* cited by examiner

*Primary Examiner* — Nicholas A Smith

(57) ABSTRACT

Disclosed are a hybrid system and method of waste heat utilization-based photovoltaic power generation and seawater desalination, wherein a photovoltaic power generation unit includes a linear Fresnel lens, a beam-splitting cooling tube, a solar cell, and a heat collecting tube; a seawater supply unit includes a seawater storage tank and a pre-treatment storage tank; a heat storage and temperature control unit includes a phase-change heat reservoir and heat exchangers; an electrodialysis unit includes poles, an ion-selective membrane, a desalination chamber, a concentration chamber, pole chambers, a concentrated liquid storage tank and a desalinated liquid storage tank; and an electricity storage and control unit includes a battery pack and a circuit controller. Incident sunlight achieves photovoltaic power generation by a light condensation followed by beam splitting mode; nanoparticle doped seawater absorbs long-wavelength light and transmits short-wavelength light.

18 Claims, 3 Drawing Sheets

(51) Int. Cl.
*C02F 103/08* (2006.01)
*H02S 40/44* (2014.01)

(52) U.S. Cl.
CPC .... *C02F 2103/08* (2013.01); *C02F 2201/009* (2013.01); *C02F 2301/08* (2013.01); *C02F 2303/10* (2013.01)

HYBRID SYSTEM AND METHOD OF WASTE HEAT UTILIZATION-BASED PHOTOVOLTAIC POWER GENERATION AND SEAWATER DESALINATION

CROSS-REFERENCE TO RELATED APPLICATIONS

This application claims priority from the Chinese patent application 2022110289900 filed Aug. 25, 2022, the content of which is incorporated herein in the entirety by reference.

TECHNICAL FIELD

The present disclosure relates to the field of solar energy utilization and seawater desalination, and in particular to a hybrid system and method of waste heat utilization-based photovoltaic power generation and seawater desalination.

BACKGROUND

Stable harvesting of electricity is an important factor affecting the quality of production life in the offshore and island areas. Although solar irradiation resources are abundant in the offshore and island areas and corresponding photovoltaic power generation technologies have also gained widespread use, current photovoltaic power generation devices always have bottlenecks of intermittent operation and low photoelectric power generation efficiency due to the influence of weather conditions, alternation of day and night, and fluctuations in solar radiation intensity.

In addition, the seawater desalination technology is an important approach to meet the supply of fresh water resources in the offshore and island areas. In conventional seawater desalination processes, a multi-stage flash distillation process requires preheating of seawater prior to evaporation through a low-pressure flash distillation chamber, and therefore is less flexible to operate and is high in pump energy consumption; a low-temperature multi-effect distillation process is based on spraying and low-temperature multi-stage steam tube evaporation, wherein the volume of equipment is large, and tubes are prone to scaling. A reverse osmosis process utilizes a high pressure difference to drive transmembrane osmosis of water, requiring high structural strength of the membrane. Therefore, there is a need to develop a seawater desalination technology with low energy consumption, long service life, and easiness in maintenance.

The electrodialysis technology has the advantages of fast response, high stability and simple structure and is suitable for small and medium-sized seawater desalination engineering in the islands and the like. However, the current electrodialysis technology still suffers from the drawbacks of incomplete desalination, poor quality of output water, and low water recovery due to slower mass transfer process of electrodialysis, and lower ion selectivity and ion flux of the membrane. The current electrodialysis technology focuses on improving ion-selective membranes, and has complex process and expensive manufacturing, and there is no effective way to regulate.

The above information disclosed in the background section merely serves to enhance the understanding of the background of the present disclosure, and thus may contain information of prior art that is not well known to those of ordinary skill in the art.

SUMMARY

In view of the above problems, an objective of the present disclosure is to provide a hybrid system and method of waste heat utilization-based photovoltaic power generation and seawater desalination in order to overcome the deficiencies of the above prior art. A plasmonic solar cell is used for concentrated photovoltaic power generation, nanoparticle doped seawater is used for beam splitting of light, and meanwhile, a phase-change heat reservoir is used for collecting heat from a photovoltaic power generation unit and for providing heat to an electrodialysis unit stably and continuously, thereby increasing a salt ion removal rate and reducing energy consumption. The photovoltaic power generation unit provides electrical energy required for an uninterrupted electrodialysis process of the system, without external electricity supply; the production ratio of the electrical energy to fresh water can also be dynamically adjusted by adjusting the number of electrodialysis units in series or in parallel to meet actual demands for electricity and water. The objective of the present disclosure is achieved by the following technical solution.

A hybrid system of waste heat utilization-based photovoltaic power generation and seawater desalination includes a seawater supply unit, a photovoltaic power generation unit, a heat storage and temperature control unit, electrodialysis units, and an electricity storage and control unit.

The seawater supply unit includes:

a seawater storage tank storing room-temperature seawater, and a pre-treatment storage tank receiving seawater from the seawater storage tank and being doped with nanoparticles.

The photovoltaic power generation unit includes:

a linear Fresnel lens for transmitting and focusing incident parallel sunlight to a beam-splitting cooling tube;

the beam-splitting cooling tube whose walls are high-transmittance glass and wherein nanoparticle doped seawater inside absorbs long-wavelength light for heating liquid and meanwhile transmits short-wavelength light to a surface of a solar cell; the solar cell having an upper surface that receives short-wavelength focused sunlight; and a heat collecting tube inside which a heat-carrying working medium flows to collect waste heat of the solar cell and reduce the temperature of the solar cell.

The heat storage and temperature control unit includes:

a phase-change heat reservoir being connected to the beam-splitting cooling tube and the heat collecting tube to store heat from the beam-splitting cooling tube and the heat collecting tube and to supply heat to the electrodialysis unit;

a first heat exchanger in which room-temperature seawater is heated by the nanoparticle doped seawater from the beam-splitting cooling tube and the phase-change heat reservoir before being introduced into the electrodialysis unit; and a second heat exchanger in which the room-temperature seawater is heated by the heat-carrying working medium from the heat collecting tube and the phase-change heat reservoir before being introduced into the electrodialysis unit.

Each electrodialysis unit includes:

a positive pole and a negative pole;

a positive pole chamber located between the positive pole and the negative pole and being proximate to the positive pole, and a negative pole chamber located between the positive pole and the negative pole and being proximate to the negative pole;

at least one set of concentration chambers and desalination chambers, which are arranged in sequence between the positive pole chamber and the negative pole chamber and are arranged alternately at intervals, wherein seawater from the first heat exchanger and the second heat exchanger are concentrated in the concentration chambers and are desalinated in the desalination chambers;

at least one set of cation-selective membranes and anion-selective membranes, which are arranged in sequence between the positive pole chamber and the negative pole chamber and are arranged alternately at intervals;

a concentrated liquid storage tank and a desalinated liquid storage tank, which collect a concentrated liquid from the concentration chambers and desalinated liquid from the desalination chambers, respectively.

The electricity storage and control unit includes:

a battery pack having two ends connected to the positive pole and negative pole, and storing electrical energy generated by the photovoltaic power generation unit; and a circuit controller connected to the battery pack to convert direct current output by the battery pack to alternating current.

In the hybrid system of waste heat utilization-based photovoltaic power generation and seawater desalination, a first pump is connected to the beam-splitting cooling tube and the phase-change heat reservoir respectively; the nanoparticle doped seawater, driven by the first pump, circulates sequentially in the beam-splitting cooling tube, the phase-change heat reservoir, and the first heat exchanger; the nanoparticle doped seawater performs beam splitting on incident parallel sunlight in the beam-splitting cooling tube and absorbs long-wavelength light to be heated; and the nanoparticle doped seawater heats seawater from the seawater storage tank in the first heat exchanger.

In the hybrid system of waste heat utilization-based photovoltaic power generation and seawater desalination, the nanoparticle doped seawater contains nanoparticles and ions, and the nanoparticles are metallic materials, metal oxide materials or non-metallic materials.

In the hybrid system of waste heat utilization-based photovoltaic power generation and seawater desalination, a second pump is connected to the heat collecting tube and the phase-change heat reservoir respectively; and the heat-carrying working medium, driven by the second pump, is heated by the heat collecting tube, is subjected to heat storage and temperature control by the phase-change heat reservoir, and then transfers heat to the room-temperature seawater from the seawater storage tank in the second heat exchanger, and the cooled heat-carrying working medium returns to the heat collecting tube, forming closed-loop circulation.

In the hybrid system of waste heat utilization-based photovoltaic power generation and seawater desalination, the solar cell includes a window layer, an active layer, a back surface field layer, a substrate, a copper sheet and a heat insulating material stacked in order from top to bottom, wherein metallic nanoparticles are disposed between the window layer and the active layer.

In the hybrid system of waste heat utilization-based photovoltaic power generation and seawater desalination, the heat collecting tube is disposed between the copper sheet and the heat insulating material.

In the hybrid system of waste heat utilization-based photovoltaic power generation and seawater desalination, the cation-selective membrane or the anion-selective membrane contains a nanochannel with an asymmetric structure for creating an ion rectification effect for unidirectional conduction of ions in the nanochannel In the hybrid system of waste heat utilization-based photovoltaic power generation and seawater desalination, the asymmetric structure includes a hemichannel on a concentration chamber side and a hemichannel on a desalination chamber side, wherein the hemichannel on the concentration chamber side is greater than the hemichannel on the desalination chamber side in size, and the hemichannel on the concentration chamber side and the hemichannel on the desalination chamber side form a mutually supporting structure.

In the hybrid system of waste heat utilization-based photovoltaic power generation and seawater desalination, a plurality of the electrodialysis units are arranged in series or in parallel.

A use method of the hybrid system of waste heat utilization-based photovoltaic power generation and seawater desalination includes the following steps:

in a combined power generation-water production mode when solar energy is sufficient, doping nanoparticles in seawater in a seawater storage tank in a pre-treatment storage tank, enabling the nano particles doped seawater to enter a beam-splitting cooling tube via a first valve, transmitting and focusing sunlight to a surface of the beam-splitting cooling tube by a linear Fresnel lens, absorbing, by the nanoparticle doped seawater inside the beam-splitting cooling tube, long-wavelength sunlight for heating, transmitting short-wavelength sunlight to an upper surface of a solar cell for photoelectric conversion, and storing resulting electrical energy in a battery pack via wires;

after exporting the heated nanoparticle doped seawater from the beam-splitting cooling tube, driving the nanoparticle doped seawater by a first pump to enter a phase-change heat reservoir, transferring part of heat to a phase-change material for heat storage and temperature control, then enabling the nanoparticle doped seawater to enter a first heat exchanger and transferring heat to room-temperature seawater from the seawater storage tank, and returning cooled nanoparticle doped seawater to the beam-splitting cooling tube;

collecting photovoltaic waste heat of the solar cell by a heat-carrying working medium in the heat collecting tube, subsequently driving the heat-carrying working medium by a second pump to enter the phase-change heat reservoir for heat storage and temperature control, heating room-temperature seawater from the seawater storage tank in a second heat exchanger, returning cooled heat-carrying working medium to the heat collecting tube, and supplying power to the first pump and the second pump by a battery pack via a circuit controller, to drive cyclic transport of the nanoparticle doped seawater and the heat-carrying working medium;

introducing the seawater heated in the first heat exchanger and the second heat exchanger into a concentration chamber and a desalination chamber of an electrodialysis unit, the battery pack being powered as a direct current power source for the electrodialysis unit, and when driven by an electric field, cations in the seawater moving towards a negative pole and passing through a cation-selective membrane to reach the concentration chamber, and anions moving towards a positive pole and passing through an anion-selective membrane to reach the concentration chamber such that salt ions in the concentration chamber are concentrated constantly and salt ions in the desalination chamber are constantly removed;

in a water production mode when solar energy is insufficient, using heat stored in the phase-change heat reservoir as a heat source needed for the electrodialysis unit, obtaining heat by the nanoparticle doped seawater from the phase-change heat reservoir, then heating the room-temperature seawater from the seawater storage tank by the nanoparticle doped seawater in the first heat exchanger, and controlling the second valve to return the cooled nanoparticle doped seawater directly to the phase-change heat reservoir driven by the first pump;

after the heat-carrying working medium obtains heat in the phase-change heat reservoir, heating the room-temperature seawater from the seawater storage tank again in the second heat exchanger, then controlling a third valve to drive the cooled heat-carrying working medium to directly return to the phase-change heat reservoir driven by the second pump, and supplying power to the first pump and the second pump by electrical energy in the battery pack stored when solar energy is sufficient via a circuit controller to drive cyclic transport of the nanoparticle doped seawater and the heat-carrying working medium; and introducing the seawater heated in the first heat exchanger and the second heat exchanger into the concentration chamber and the desalination chamber of the electrodialysis unit, driving the electrodialysis unit to operate by the electrical energy of the battery pack, and when driven by an electric field, cations in the seawater moving towards a negative pole and passing through a cation-selective membrane to reach the concentration chamber, and anions moving towards a positive pole and passing through an anion-selective membrane to reach the concentration chamber such that salt ions in the concentration chamber are concentrated constantly and salt ions in the desalination chamber are constantly removed.

Compared to the prior art, the present disclosure has the following advantages.

(1) The electrical energy required for the uninterrupted electrodialysis process is from photovoltaic power generation of the solar cell, and thus the system enables self-supply of the electrical energy. In addition, the proportion of the photovoltaic power generation capacity and fresh water production is dynamically adjusted by adjusting the number of the electrodialysis units in series or in parallel, to meet demands on water and electricity under different conditions during different periods of time.

(2) the metallic nanoparticles are used to facilitate the light capturing of the solar cell; the nanoparticle doped seawater is used to perform beam splitting on the focused sunlight; the heat-carrying working medium is used to take away photovoltaic waste heat, and the collected heat is used to heat the electrodialysis chamber through the phase-change heat reservoir and the heat exchangers, thereby not only avoiding degradation in performance due to high temperature of the solar cell, also increasing the temperature of the electrodialysis chamber, and increasing the ion flux and selectivity of the ion-selective membrane. Thus, the system and the method can increase photovoltaic power generation efficiency, suppress concentration polarization of electrodialysis, and reduce energy consumption.

(3) The nanochannel with the asymmetric structure in the ion-selective membrane can produce the ion rectification effect, suppressing the ion diffusion process driven by the concentration difference from the concentration chamber to the desalination chamber, increasing the salt removal rate of the electrodialysis process, and reducing the salt content of the desalination chamber and the desalinated liquid. Furthermore, the asymmetric structures of the nanochannels can support each other, thereby having better cycling performance and longer service life.

(4) The system operates uninterruptedly in two operating modes according to real-time weather conditions. That is, when solar energy is sufficient, beam splitting on focused light for photovoltaic power generation and electrodialysis for seawater desalination are performed; and when solar energy is insufficient, electrodialysis performance continues to be improved by relying on the heat released by the phase-change heat reservoir, stable and continuous fresh water production can be achieved while the electrical energy is output. Therefore, the system can be applied to photovoltaic power generation and seawater desalination in offshore and island areas.

The above description is merely an overview of the technical solutions of the present disclosure. In order to make the technical means of the present disclosure clearer to reach the extent that those skilled in the art can implement the present disclosure according to the content of the description, and to make the above description and other objectives, features and advantages of the present disclosure more obvious and understandable, specific embodiments of the present disclosure are illustrated below.

BRIEF DESCRIPTION OF THE DRAWINGS

Various other advantages and benefits of the present disclosure will become apparent to those of ordinary skill in the art upon reading the following detailed description in the preferred specific embodiments. The drawings of the description are only for the purposes of illustrating the preferred embodiments and are not considered to limit the present disclosure. Obviously, the drawings described below are merely some embodiments of the present disclosure, and those of ordinary skill in the art can obtain other drawings from these drawings without the inventive step. Furthermore, identical parts are denoted by identical reference numerals throughout the drawings.

In the drawings.

Figure 1:
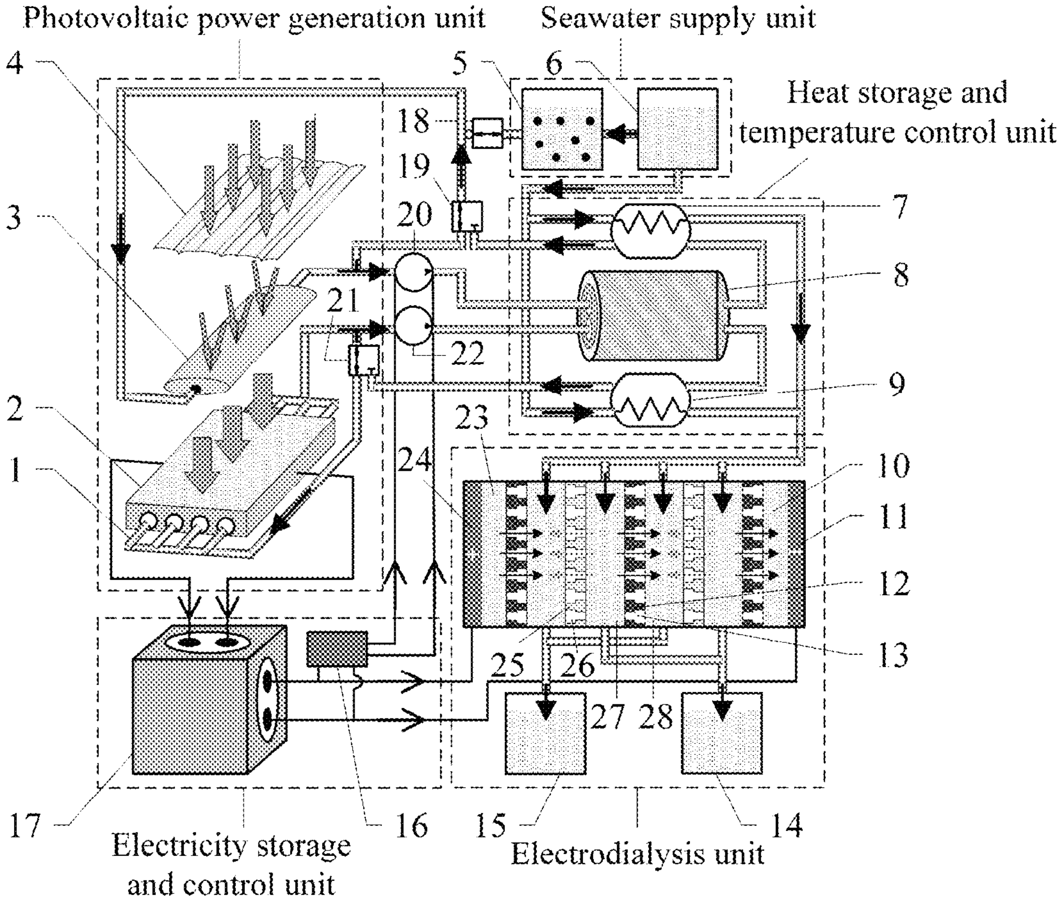
FIG. 1 is a schematic structural diagram of a hybrid system of waste heat utilization-based photovoltaic power generation and seawater desalination according to an embodiment of the present disclosure.

wherein 1—heat collecting tube, 2—solar cell, 3—beam-splitting cooling tube, 4—linear Fresnel lens, 5—pretreatment storage tank, 6—seawater storage tank, 7—first heat exchanger, 8—phase-change heat reservoir, 9—second heat exchanger, 10—negative pole chamber, 11—negative pole, 12—cation-selective membrane, 13—cation-selective nanochannel, 14—desalinated liquid storage tank, 15—concentrated liquid storage tank, 16—circuit controller, 17—battery pack, 18—first valve, 19—second valve, 20—first pump, 21—third valve, 22—second pump, 23—positive pole chamber, 24—positive pole, 25—anion-selective membrane, 26—anion-selective nanochannel, 27—desalination chamber, 28—concentration chamber.

The present disclosure is further explained below with reference to the drawings and embodiments.

DETAILED DESCRIPTION

Specific embodiments of the present disclosure will be described in more detail below with reference to FIGS. 1-3. Although the specific embodiments of the present disclosure are shown in the drawings, it should be understood that the present disclosure may be implemented in various forms and should not be limited to the embodiments set forth herein. On the contrary, these embodiments are provided so that the present disclosure may be understood more thoroughly, and may fully convey the scope of the present disclosure to those skilled in the art.

It should be noted that certain words are used in the description and claims to refer to particular components. Those skilled in the art may understand that the skilled person may refer to the same component by different nouns. The description and claims do not use a difference in noun as a way to distinguish the components, but use a difference in function of components as a criterion for the distinction. As referred to throughout the description and claims, "including" or "comprising" is an open-ended term, and thus should be interpreted to mean "including, but not limited to". The following description describes the preferred embodiments for implementing the present disclosure, but is intended for the general principle of the description and is not intended to limit the scope of the present disclosure. The scope of protection of the present disclosure is as defined by the appended claims.

To facilitate the understanding of the embodiments of the present disclosure, specific embodiments will be further described below, by way of example, in conjunction with the drawings, and each of the drawings is not to be construed as limiting the embodiments of the present disclosure.

For better understanding, a hybrid system of waste heat utilization-based photovoltaic power generation and seawater desalination as shown in FIG. 1 includes a seawater supply unit, a photovoltaic power generation unit, a heat storage and temperature control unit, an electrodialysis unit, and an electricity storage and control unit.

In the seawater supply unit, a seawater storage tank 6 internally stores room-temperature seawater from which sediment impurities have been removed, and a pre-treatment storage tank 5 receives seawater that is from the seawater storage tank 6 and is doped with nanoparticles.

In the photovoltaic power generation unit, a linear Fresnel lens 4 is used to transmit and focus incident parallel sunlight to a beam-splitting cooling tube 3, and walls of the beam-splitting cooling tube 3 are high-transmittance glass; the nanoparticle doped seawater inside absorbs long-wavelength light for heating liquid, and meanwhile transmits short-wavelength light to a surface of a solar cell 2; the nanoparticle doped seawater contains nanoparticles and a plurality of ions and circulates, driven by a first pump 20, in the beam-splitting cooling tube 3, a phase-change heat reservoir 8, and a first heat exchanger 7 sequentially; incident light is subjected to beam splitting in the beam-splitting cooling tube 3 to heat itself, and the room-temperature seawater from the seawater storage tank 6 is heated in the first heat exchanger 7. The nanoparticles may be high-heat-conductivity materials such as metallic materials, metal oxide materials, and non-metallic materials, and the particle size and mass fraction of the nanoparticles can be adjusted according to beam splitting of light and light absorption needs.

Figure 2:
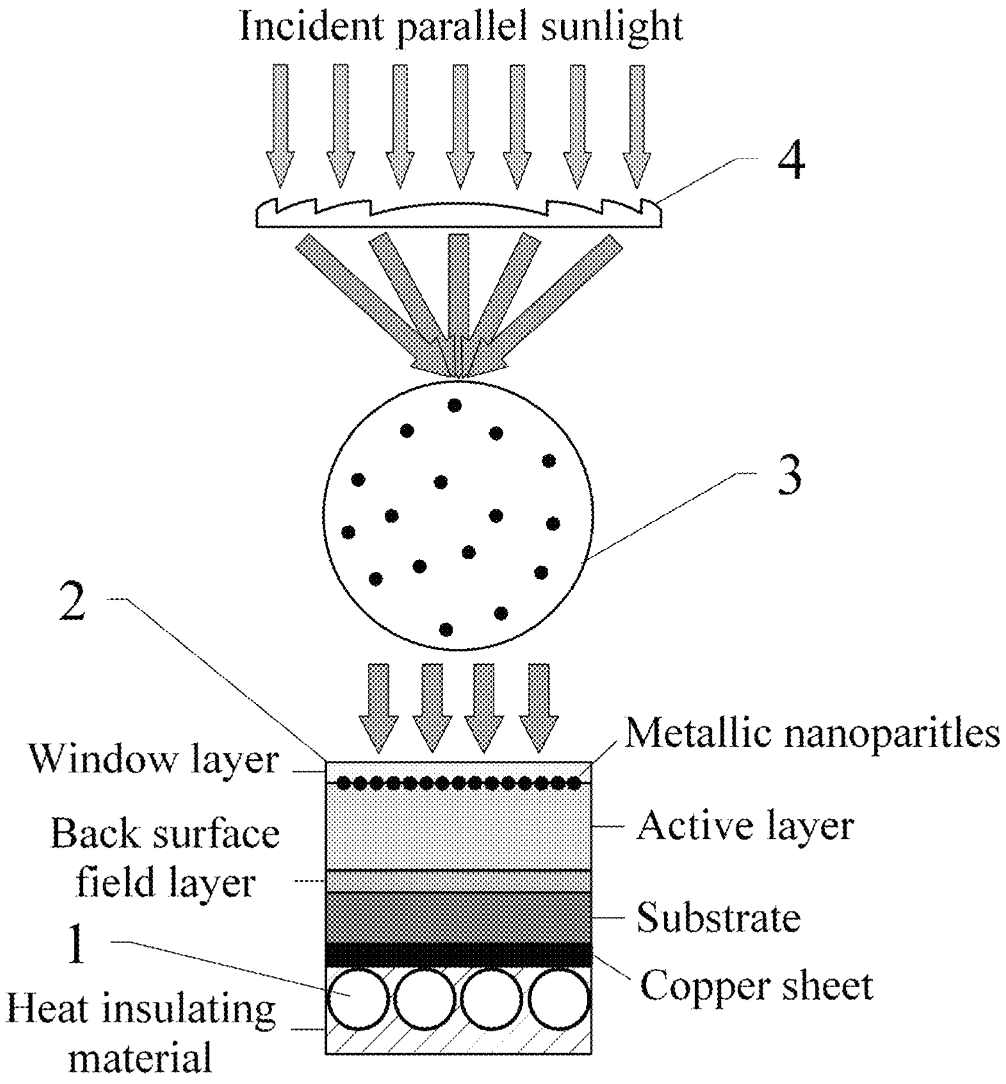
FIG. 2 is a schematic structural diagram of a photovoltaic power generation unit of a hybrid system of waste heat utilization-based photovoltaic power generation and seawater desalination according to an embodiment of the present disclosure.

As shown in FIG. 2, an upper surface of the solar cell 2 receives short-wavelength focused sunlight for photoelectric conversion, metallic nanoparticles are disposed between a window layer and an active layer, and light capture and light absorption are promoted by exciting local surface plasmons of the metallic nanoparticles, improving solar energy utilization.

A heat-carrying working medium circulating inside a heat collecting tube 1 collects photovoltaic waste heat and reduces the temperature of the solar cell 2, avoiding degradation in performance due to a local high temperature. The heat-carrying working medium, driven by a second pump 22, is heated by the heat collecting tube 1, is subjected to heat storage and temperature control by the phase-change heat reservoir 8, transfers heat to the room-temperature seawater from the seawater storage tank 6 in a second heat exchanger 9, and the cooled heat-carrying working medium returns to the heat collecting tube 1, forming a closed loop circulation.

In the heat storage and temperature control unit, the phase-change heat reservoir 8 stores heat from the beam-splitting cooling tube 3 and the heat collecting tube 1, the phase-change heat reservoir 8 is internally filled with a plurality of phase-change materials having different phase-change temperatures to cope with the dynamic changes over time in the temperature of the seawater and the heat-carrying working medium at an input end under conditions of sufficient light, insufficient light or the like, and meanwhile, an output temperature is regulated according to the heat demands of the electrodialysis units.

The room-temperature seawater is heated in the first heat exchanger 7 by the high-temperature nanoparticle doped seawater from the beam-splitting cooling tube 3 and the phase-change heat reservoir 8, and meanwhile, is heated in the second heat exchanger 9 by the high-temperature heat-carrying working medium from the heat collecting tube 1 and the phase-change heat reservoir 8, and then is introduced into each electrodialysis unit. The mass transfer process of the electrodialysis unit, strengthened by medium and high temperatures, can accelerate the desalination rate, suppress the concentration polarization phenomena and reduce the electrical energy consumption of seawater desalination.

In each electrodialysis unit, a positive pole 24 and a negative pole 11 are connected to two ends of a battery pack 17 respectively, and a positive pole chamber 23 and a negative pole chamber 10 are located nearby the positive pole 24 and the negative pole 11 respectively; the seawater at medium and high temperatures from the first heat exchanger 7 and the second heat exchanger 9 is combined and then is concentrated and desalinated in a concentration chamber 28 and a desalination chamber 27 respectively; a cation-selective membrane 12 and an anion-selective membrane 25 are located between the concentration chamber 28 and a desalination chamber 27; and a concentrated liquid storage tank 15 and a desalinated liquid storage tank 14 collect a concentrated liquid from the concentration chamber 28 and desalinated liquid from the desalination chamber 27 respectively.

Figure 3:
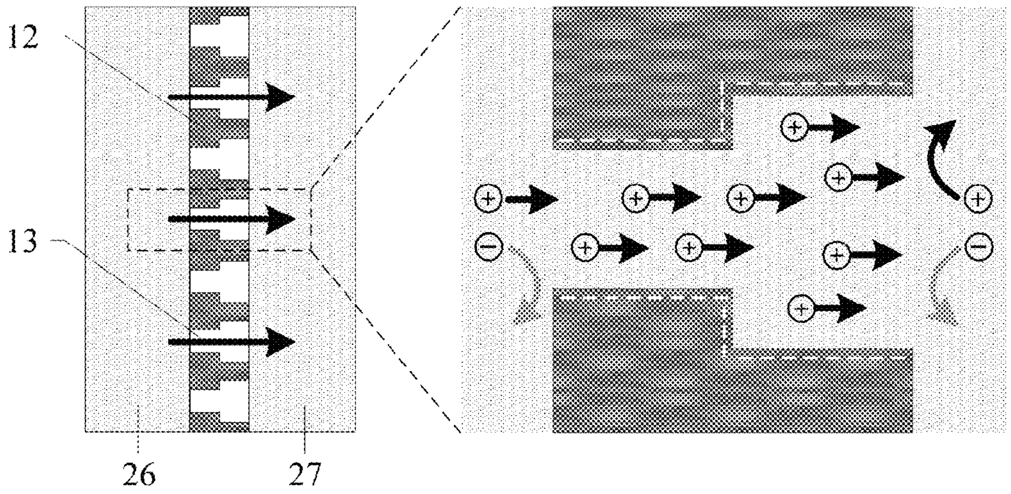
FIG. 3 is a schematic structural diagram of an electrodialysis unit of a photovoltaic power generation unit of a hybrid system of waste heat utilization-based photovoltaic power generation and seawater desalination according to an embodiment of the present disclosure.

As shown in FIG. 3, the cation-selective membrane 12 internally contains a cation-selective nanochannel 13 with an asymmetric structure, and the anion-selective membrane 25 internally contains an anion-selective nanochannel 26 with an asymmetric structure; and the asymmetric structure is used to create an ion rectification effect for unidirectional conduction of ions in the nanochannels, thereby allowing an electric field to drive cations to reach the concentration chamber 28 through the cation-selective nanochannel 13, and to drive anions to reach the concentration chamber 28 through the anion-selective nanochannel 26, and inhibiting the ion diffusion process driven by the concentration difference from the concentration chamber 28 to the desalination chamber 27. Specifically, hemichannels of the cation-selective nanochannel 13 and the anion-selective nanochannel 26 on a concentration chamber 28 side are greater than hemichannels of the cation-selective nanochannel 13 and the anion-selective nanochannel 26 on a desalination chamber 27 side, and mutually supporting structures are formed. The size of the channels can be optimally designed according to electrodialysis demands.

The electrodialysis units may be arranged in series to fully utilize the photovoltaic waste heat and reduce the salt content of fresh water, and the in-series number may be adjusted according to the demands on the salt content of the fresh water; specifically, the desalinated liquid may be imported to the next-stage electrodialysis unit for multiple times of electrodialysis; and the electrodialysis units can also be arranged in parallel to fully utilize the photovoltaic waste heat and increase fresh water production, that is, desalinated liquid is obtained from a plurality of electrodialysis units, and the parallel number may be adjusted according to the demands on the fresh water production. Therefore, the proportion of the photovoltaic power generation capacity and fresh water production may be adjusted dynamically, to meet demands on water and electricity under different conditions during different periods of time.

In the electricity storage and control unit, the battery pack 17 stores the electrical energy generated by the photovoltaic power generation unit and serves as a power source for electrodialysis and pump work, and a circuit controller 16 converts direct current output by the battery pack 17 into alternating current, which then supplies power to the first pump 20 and the second pump 22, while being used for circuit control of the system.

In an embodiment, the nanoparticles are high-heat-conductivity nano-materials whose particle size and mass fraction can be adjusted according to beam splitting of light and light absorption needs, and the nano-materials may be metallic materials, metal oxide materials, and non-metallic materials. The phase-change heat reservoir is filled with a plurality of phase-change materials having different phase-change temperatures, to cope with dynamic changes over time in the temperature of the seawater and the heat-carrying working medium at the input end of the phase-change heat reservoir under conditions of sufficient light, insufficient light or the like. Meanwhile, the output temperature is regulated according to the heat demands of the electrodialysis units, and the mass transfer process of electrodialysis is strengthened using medium and high temperatures, accelerating the desalination rate, suppressing the concentration polarization phenomena and reducing the electrical energy consumption of seawater desalination. The electrodialysis units may be arranged in series to fully utilize the photovoltaic waste heat and reduce the salt content of fresh water, and the in-series number may be adjusted according to the demands on the salt content of the fresh water; specifically, the desalinated liquid may be imported to the next-stage electrodialysis unit for multiple times of electrodialysis; and the electrodialysis units can also be arranged in parallel to fully utilize the photovoltaic waste heat and increase fresh water production, that is, desalinated liquid is obtained from a plurality of electrodialysis units, and the parallel number may be adjusted according to the demands on the fresh water production. Therefore, the proportion of the photovoltaic power generation capacity and fresh water production may be adjusted dynamically, to match demands on water and electricity under different conditions during different periods of time.

A use method of the hybrid system of waste heat utilization-based photovoltaic power generation and seawater desalination has two operating modes.

The first operating mode is a combined power generation-water production mode when solar energy is sufficient. Nanoparticles are doped in seawater from the seawater storage tank 6 in the pre-treatment storage tank 5, and the nanoparticle doped seawater enters the beam-splitting cooling tube 3 via a first valve 18; the linear Fresnel lens 4 transmits and focuses sunlight to the surface of the beam-splitting cooling tube 3; the nanoparticle doped seawater inside the beam-splitting cooling tube 3 absorbs long-wavelength sunlight for heating, transmits short-wavelength focused sunlight to the upper surface of the solar cell 2 for photoelectric conversion; and resulting electrical energy is stored in the battery pack 17 via wires.

After the heated nanoparticle doped seawater is exported out from the beam-splitting cooling tube 3, the nanoparticle doped seawater is driven by the first pump 20 to enter the phase-change heat reservoir 8, transfers part of heat to a phase-change material for heat storage and temperature control, then enters the first heat exchanger 7 and transfers heat to room-temperature seawater from the seawater storage tank 6; and the cooled nanoparticle doped seawater returns to the beam-splitting cooling tube 3.

A heat-carrying working medium collects photovoltaic waste heat in the heat collecting tube 1, is subsequently driven by the second pump 22 to enter the phase-change heat reservoir 8 for heat storage and temperature control, and then heats room-temperature seawater from the seawater storage tank 6 in the second heat exchanger 9; the cooled heat-carrying working medium returns to the heat collecting tube 1; the batter pack 17 supplies power to the first pump 20 and the second pump 22 via the circuit controller, driving cyclic transport of the nanoparticle doped seawater and the heat-carrying working medium in the above process.

The heated seawater at medium and high temperatures in the first heat exchanger 7 and the second heat exchanger 9 is introduced into the concentration chamber 28 and the desalination chamber 27 of each electrodialysis unit; a part of electrical energy of the battery pack 17 is used as a DC power source for each electrodialysis unit; being driven by the electric field, cations in the seawater at medium and high temperatures move towards the negative pole, that is, from the desalination chamber 27 to the concentration chamber 28 through the cation-selective nanochannel 13 in the cation-selective membrane 12; anions move towards the positive pole, that is, from the desalination chamber 27 to the concentration chamber 28 through anion-selective nanochannel 26 in the anion-selective membrane 25, such that salt ions in the concentration chamber 28 are concentrated constantly and salt ions in the desalination chamber 27 are constantly removed.

The second operating mode is a water production mode when solar energy is insufficient. Heat stored in the phase-change heat reservoir 8 serves as a heat source needed for each electrodialysis unit; the nanoparticle doped seawater obtains heat from the phase-change heat reservoir 8, and then heats the room-temperature seawater from the seawater storage tank 6 in the first heat exchanger 7; and a second valve 19 is controlled to return the cooled nanoparticle doped seawater driven by the first pump 20 directly to the phase-change heat reservoir 8.

After obtaining heat in the phase-change heat reservoir 8, the heat-carrying working medium heats the room-temperature seawater from the seawater storage tank 6 in the second heat exchanger 9; a third valve 21 is controlled to return the cooled heat-carrying working medium driven by the second pump 22 directly to the phase-change heat reservoir 8; and a small amount of electrical energy in the battery pack 17 stored when solar energy is sufficient supplies power to the first pump 20 and the second pump 22 via the circuit controller 16 to drive cyclic transport of the nanoparticle doped seawater and the heat-carrying working medium.

The heated seawater at medium and high temperatures in the first heat exchanger 7 and the second heat exchanger 9 is introduced into the concentration chamber 28 and the desalination chamber 27 of each electrodialysis unit; a part of electrical energy of the battery pack 17 drives each electrodialysis unit to operate; being driven by the electric field, cations in the seawater at medium and high temperatures move towards the negative pole, that is, from the desalination chamber 27 to the concentration chamber 28 through the cation-selective nanochannel 13 in the cation-selective membrane 12; anions move towards the positive pole, that is, from the desalination chamber 27 to the concentration chamber 28 through anion-selective nanochannel 26 in the anion-selective membrane 25, such that salt ions in the concentration chamber 28 are concentrated constantly and salt ions in the desalination chamber 27 are constantly removed.

It is to be noted that the inventive step of the technology of the present application can be made clear from the above description in principle. The technical effects of the present application are further described below by comparison of photovoltaic power generation and electrodialysis performance. Taking a certain island in the sea as an example, the annual average radiation intensity is 4.7 kWh/($m^2$·day) and the fresh water demand is 174 tons/day. Two technologies are chosen for comparison, the first technology relates to a hybrid system of diffuse photovoltaic power generation and seawater desalination, and the second technology is a hybrid system of concentrating beam splitting photovoltaic power generation and seawater desalination of the present application. To meet the fresh water demands of the island, comparative performance indexes include the electrodialysis energy consumption required per ton of fresh water produced, the electrodialysis power consumption per day, and the minimum area of a photovoltaic panel. Due to the space limitation, only key computational results are shown here.

In the hybrid system of diffuse photovoltaic power generation and seawater desalination, a crystalline silicon material is selected for the solar cell with photoelectric efficiency of 20% and a cell temperature of 25° C. The system has no beam-splitting cooling structure, so that a photovoltaic power generation module and an electrodialysis desalination module operate independently; and the electrical energy required for electrodialysis is from photovoltaic power generation. The power density of the photovoltaic panel is first calculated: $PD_{PV}=PD_{rad}\cdot\eta=4.7$ kWh/$m^2$·day×20%≈39.2 W/$m^2$. Then electrodialysis energy consumption is calculated:

$$E = \frac{P_{pump} + P_{ED}}{Q}.$$

$P_{pump}$ is system pump work, PED is electrical power consumed by electrodialysis, and Q is produced fresh water flow. It can be known that the electrodialysis energy consumption is 4.43 kWh/ton by modelling simulation calculation. Therefore, the total system fresh water consumption is: 4.43 kWh/ton×174 ton/day=771 kWh/day. To supply electricity consumption for electrodialysis, the required solar panel area is at least: 771 kWh/day÷39.2 W/$m^2$=820 $m^2$.

In a hybrid system of concentrating beam splitting photovoltaic power generation and seawater desalination, a gallium arsenide material is selected for the solar cell with photoelectric efficiency of 30% and a cell temperature of 70° C. The system has a beam-splitting cooling and waste heat recovery structure, and the photovoltaic waste heat is used to heat the electrodialyzed seawater. The power density of the photovoltaic panel is: $PD_{PV}=PD_{rad}\cdot\eta=4.7$ kWh/$m^2$·day×30%≈58.8 W/$m^2$. Electrodialysis energy consumption is $$E = \frac{P_{pump} + P_{ED}}{Q} = 3.57\ \text{kWh/ton}.$$

Thus, the total fresh water power consumption of the system is: 3.57 kWh/ton×174 ton/day=621 kWh/day. The area of the solar panel required for the system is at least 621 kWh/day±58.8 W/$m^2$=440 $m^2$.

The performance indexes for the two technologies are summarized as shown in Table 1.

TABLE 1

Comparison of photovoltaic power generation and seawater desalination performance for two technologies

| Technology | Electrodialysis energy consumption (kWh/ton) | Total electricity consumption by electrodialysis (kWh/day) | Minimum area of photovoltaic panel ($m^2$) |
|---|---|---|---|
| Hybrid system of diffuse photovoltaic power generation and seawater desalination | 4.43 | 771 | 820 |
| Hybrid system of concentrating beam splitting photovoltaic power generation and seawater desalination | 3.57 | 621 (decrease by 19.5%) | 440 (decrease by 46.3%) |

As can be seen from Table 1, to meet the 174 ton/day fresh water demands in the island, the electrodialysis energy consumption is decreased from 4.43 kWh/ton to 3.57 kWh/ton after the system is configured with the concentrating beam splitting and photovoltaic waste heat recovery structure, and correspondingly, the electrodialysis power consumption is decreased from 771 kWh/day to 621 kWh/day per day, with a decrease by 19.5%. Since the electrical energy required for the above electrodialysis is from the photovoltaic power generation module of the system, the minimum area of the photovoltaic panel required for the system is also decreased from 820 $m^2$ to 440 $m^2$, with a decrease by 46.3%, thereby having significant advantages. This is due to the concentrating beam splitting and waste heat recovery, which not only improve the photoelectric efficiency of the solar cell, but also strengthen the mass transfer process in the electrodialysis chamber.

Although the embodiments of the present disclosure have been described above with reference to the drawings, the present disclosure is not restricted to the above specific embodiments and the field of application, and the above specific embodiments are illustrative and instructional only, and not restrictive. Those of ordinary skill in the art, in the light of the specification and without departing from the scope of the claims of the present disclosure, can take many forms, all of which fall within the scope of the present disclosure.

The invention claimed is:

1. A hybrid system of waste heat utilization-based photovoltaic power generation and seawater desalination, comprising a seawater supply unit, a photovoltaic power generation unit, a heat storage and temperature control unit, electrodialysis units, and an electricity storage and control unit, wherein the seawater supply unit comprises:

a seawater storage tank storing room-temperature seawater;

a pre-treatment storage tank receiving seawater from the seawater storage tank and being doped with nanoparticles;

the photovoltaic power generation unit comprises:

a linear Fresnel lens transmitting and focusing incident parallel sunlight to a beam-splitting cooling tube;

the beam-splitting cooling tube whose walls are high-transmittance glass and wherein nanoparticle doped seawater inside absorbs long-wavelength light for heating liquid and meanwhile transmits short-wavelength light to a surface of a solar cell;

the solar cell having an upper surface that receives short-wavelength focused sunlight, and a heat collecting tube inside which a heat-carrying working medium flows to collect waste heat of the solar cell and reduce the temperature of the solar cell;

the heat storage and temperature control unit comprises:

a phase-change heat reservoir being connected to the beam-splitting cooling tube and the heat collecting tube to store heat from the beam-splitting cooling tube and the heat collecting tube and to supply heat to each electrodialysis unit;

a first heat exchanger in which room-temperature seawater is heated by the nanoparticle doped seawater from the beam-splitting cooling tube and the phase-change heat reservoir before being introduced into each electrodialysis unit;

a second heat exchanger in which the room-temperature seawater is heated by the heat-carrying working medium from the heat collecting tube and the phase-change heat reservoir before being introduced into the electrodialysis unit;

each electrodialysis unit comprises:

a positive pole and a negative pole;

a positive pole chamber located between the positive pole and the negative pole and being proximate to the positive pole, and a negative pole chamber located between the positive pole and the negative pole and being proximate to the negative pole;

at least one set of concentration chambers and desalination chambers, which are arranged in sequence between the positive pole chamber and the negative pole chamber and are arranged alternately at intervals, wherein seawater from the first heat exchanger and the second heat exchanger are concentrated in the concentration chambers and are desalinated in the desalination chambers;

at least one set of cation-selective membranes and anion-selective membranes, which are arranged in sequence between the positive pole chamber and the negative pole chamber and are arranged alternately at intervals;

a concentrated liquid storage tank and a desalinated liquid storage tank, which collect a concentrated liquid from the concentration chambers and desalinated liquid from the desalination chambers, respectively;

the electricity storage and control unit comprises:

a battery pack having two ends connected to the positive pole and negative pole, and storing electrical energy generated by the photovoltaic power generation unit; and a circuit controller connected to the battery pack to convert direct current output by the battery pack to alternating current.

2. The hybrid system of waste heat utilization-based photovoltaic power generation and seawater desalination of claim 1, wherein a first pump is connected to the beam-splitting cooling tube and the phase-change heat reservoir respectively; the nanoparticle doped seawater, driven by the first pump, circulates sequentially in the beam-splitting cooling tube, the phase-change heat reservoir, and the first heat exchanger; the nanoparticle doped seawater performs beam splitting on incident parallel sunlight in the beam-splitting cooling tube and absorbs long-wavelength light to be heated; and the nanoparticle doped seawater heats seawater from the seawater storage tank in the first heat exchanger.

3. The hybrid system of waste heat utilization-based photovoltaic power generation and seawater desalination of claim 1, wherein the nanoparticle doped seawater contains nanoparticles and ions, and the nanoparticles are metallic materials, metal oxide materials or non-metallic materials.

4. The hybrid system of waste heat utilization-based photovoltaic power generation and seawater desalination of claim 1, wherein a second pump is connected to the heat collecting tube and the phase-change heat reservoir respectively, the heat-carrying working medium, driven by the second pump, is heated by the heat collecting tube, is subjected to heat storage and temperature control by the phase-change heat reservoir, and then transfers heat to the room-temperature seawater from the seawater storage tank in the second heat exchanger, and the cooled heat-carrying working medium returns to the heat collecting tube, forming closed-loop circulation.

5. The hybrid system of waste heat utilization-based photovoltaic power generation and seawater desalination of claim 1, wherein the solar cell comprises a window layer, an active layer, a back surface field layer, a substrate, a copper sheet and a heat insulating material stacked in order from top to bottom, wherein metallic nanoparticles are disposed between the window layer and the active layer.

6. The hybrid system of waste heat utilization-based photovoltaic power generation and seawater desalination of claim 5, wherein the heat collecting tube is disposed between the copper sheet and the heat insulating material.

7. The hybrid system of waste heat utilization-based photovoltaic power generation and seawater desalination of claim 1, wherein the cation-selective membrane or the anion-selective membrane contains a nanochannel with an asymmetric structure for creating an ion rectification effect for unidirectional conduction of ions in the nanochannel.

8. The hybrid system of waste heat utilization-based photovoltaic power generation and seawater desalination of claim 1, wherein an asymmetric structure comprises a hemichannel on a concentration chamber side and a hemichannel on a desalination chamber side, wherein the hemichannel on the concentration chamber side is greater than the hemichannel on the desalination chamber side in size, and the hemichannel on the concentration chamber side and the hemichannel on the desalination chamber side form a mutually supporting structure.

9. The hybrid system of waste heat utilization-based photovoltaic power generation and seawater desalination of claim 1, wherein a plurality of the electrodialysis units are arranged in series or in parallel.

10. A use method of the hybrid system of waste heat utilization-based photovoltaic power generation and seawater desalination of claim 1, comprising the following steps:

in a combined power generation-water production mode when solar energy is sufficient, doping seawater in the seawater storage tank with the nanoparticles in the pre-treatment storage tank, then enabling nanoparticle doped seawater to enter the beam-splitting cooling tube via a first valve, transmitting and focusing sunlight to a surface of the beam-splitting cooling tube by the linear Fresnel lens, absorbing long-wavelength sunlight by the nanoparticle doped seawater inside the beam-splitting cooling tube for heating, transmitting short-wavelength sunlight to an the upper surface of the solar cell for photoelectric conversion, and storing resulting electrical energy in the battery pack via wires;

after exporting heated nanoparticle doped seawater from the beam-splitting cooling tube, driving the nanoparticle doped seawater by a first pump to enter the phase-change heat reservoir, transferring part of heat to a phase-change material for heat storage and temperature control, then enabling the nanoparticle doped seawater to enter the first heat exchanger and transferring heat to the room-temperature seawater from the seawater storage tank, and returning cooled nanoparticle doped seawater to the beam-splitting cooling tube;

collecting photovoltaic waste heat of the solar cell by the heat-carrying working medium in the heat collecting tube, subsequently driving the heat-carrying working medium by a second pump to enter the phase-change heat reservoir for heat storage and temperature control, heating the room-temperature seawater from the seawater storage tank in the second heat exchanger, returning cooled heat-carrying working medium to the heat collecting tube, and supplying power to the first pump and the second pump by the battery pack via the circuit controller, to drive cyclic transport of the nanoparticle doped seawater and the heat-carrying working medium;

introducing the seawater heated in the first heat exchanger and the second heat exchanger into a concentration chamber and a desalination chamber of at least one of the electrodialysis units, the battery pack being powered as a direct current power source for the at least one electrodialysis unit, and when driven by an electric field, cations in the seawater moving towards the negative pole and passing through the cation-selective membrane to reach the concentration chamber, and anions moving towards the positive pole and passing through the anion-selective membrane to reach the concentration chamber such that salt ions in the concentration chamber are concentrated constantly and salt ions in the desalination chamber are constantly removed;

in a water production mode when solar energy is insufficient, using heat stored in the phase-change heat reservoir as a heat source needed for the at least one electrodialysis unit, obtaining heat by the nanoparticle doped seawater from the phase-change heat reservoir, then heating the room-temperature seawater from the seawater storage tank by the nanoparticle doped seawater in the first heat exchanger, and controlling the second valve to return the cooled nanoparticle doped seawater directly to the phase-change heat reservoir driven by the first pump;

after the heat-carrying working medium obtains heat in the phase-change heat reservoir, heating the room-temperature seawater from the seawater storage tank in the second heat exchanger, then controlling a third valve to drive the cooled heat-carrying working medium to directly return to the phase-change heat reservoir by the second pump, and supplying power to the first pump and the second pump by electrical energy in the battery pack stored when solar energy is sufficient via the circuit controller to drive cyclic transport of the nanoparticle doped seawater and the heat-carrying working medium; and introducing the seawater heated in the first heat exchanger and the second heat exchanger into the concentration chamber and the desalination chamber of the at least one electrodialysis unit, driving the at least one electrodialysis unit to operate by the electrical energy of the battery pack, and when driven by an electric field, cations in the seawater moving towards the negative pole and passing through the cation-selective membrane to reach the concentration chamber, and anions moving towards the positive pole and passing through the anion-selective membrane to reach the concentration chamber such that salt ions in the concentration chamber are concentrated constantly and salt ions in the desalination chamber are constantly removed.

11. The method of claim 10, wherein the first pump is connected to the beam-splitting cooling tube and the phase-change heat reservoir respectively; the nanoparticle doped seawater, driven by the first pump, circulates sequentially in the beam-splitting cooling tube, the phase-change heat reservoir, and the first heat exchanger; the nanoparticle doped seawater performs beam splitting on incident parallel sunlight in the beam-splitting cooling tube and absorbs long-wavelength light to be heated; and the nanoparticle doped seawater heats seawater from the seawater storage tank in the first heat exchanger.

12. The method of claim 10, wherein the nanoparticle doped seawater contains nanoparticles and ions, and the nanoparticles are metallic materials, metal oxide materials or non-metallic materials.

13. The method of claim 10, wherein the second pump is connected to the heat collecting tube and the phase-change heat reservoir respectively, the heat-carrying working medium, driven by the second pump, is heated by the heat collecting tube, is subjected to heat storage and temperature control by the phase-change heat reservoir, and then transfers heat to the room-temperature seawater from the seawater storage tank in the second heat exchanger, and the cooled heat-carrying working medium returns to the heat collecting tube, forming closed-loop circulation.

14. The method of claim 10, wherein the solar cell comprises a window layer, an active layer, a back surface field layer, a substrate, a copper sheet and a heat insulating material stacked in order from top to bottom, wherein metallic nanoparticles are disposed between the window layer and the active layer.

15. The method of claim 14, wherein the heat collecting tube is disposed between the copper sheet and the heat insulating material.

16. The method of claim 10, wherein the cation-selective membrane or the anion-selective membrane contains a nano-channel with an asymmetric structure for creating an ion rectification effect for unidirectional conduction of ions in the nanochannel.

17. The method of claim 10, an asymmetric structure comprises a hemichannel on a concentration chamber side and a hemichannel on a desalination chamber side, wherein the hemichannel on the concentration chamber side is greater than the hemichannel on the desalination chamber side in size, and the hemichannel on the concentration chamber side and the hemichannel on the desalination chamber side form a mutually supporting structure.

18. The method of claim 10, a plurality of the electrodialysis units are arranged in series or in parallel.

* * * * *